Figure 1:
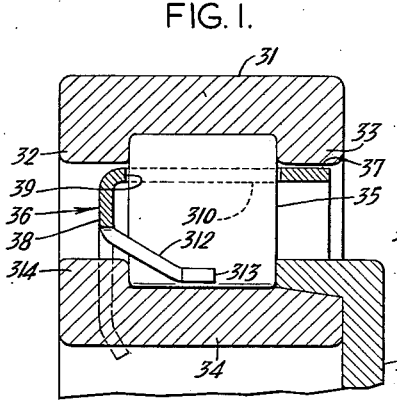

Feb. 25, 1964    K. E. A. GÖTHBERG ETAL    3,122,400
ROLLER BEARING
Filed Feb. 6, 1961

INVENTORS:
KARL EVALD ANDREAS GÖTHBERG
SVEN-ERIK MALMSTRÖM
BY Howson & Howson
ATTYS.

////# United States Patent Office 3,122,400
Patented Feb. 25, 1964

3,122,400
ROLLER BEARING
Karl Evald Andreas Göthberg, Backasen, Lerum, and Sven-Erik Malmström, Goteborg, Sweden, assignors to Aktiebolaget Svenska Kullagerfabriken, Goteborg, Sweden, a corporation of Sweden
Filed Feb. 6, 1961, Ser. No. 87,279
Claims priority, application Sweden Mar. 2, 1960
1 Claim. (Cl. 308—217)

The present invention relates to a roller bearing having a sheet metal cage with openings for the rollers, so-called pockets, the cage having a mantle portion of a diameter greater or less than that of the pitch circle of the rollers. The said cage mantle is connected to a substantially flat portion located at one end of the rollers and has a plurality of tongues, one for each roller. Each tongue is inclined inwards between two rollers and prevents the rollers from dropping out of the cage thereby that the roller retaining portions of the tongues are located at the opposite side of the pitch surface opposite to the mantle of the cage.

The bearing according to the invention differs from known types of roller bearings in which the roller retaining tongues have constant width along their whole length and are parallel with the axes of rotation of the respective rollers in that the tongues are bent obliquely inwards between two adjacent rollers and that the free ends of said tongues are broader than the remaining portion of the tongues in order to support the roller when one of the bearing rings is lacking in the bearing and that the supporting portion of the tongue is substantially bisected by a plane perpendicular to the axis of the roller and passing through the centre of gravity of the roller.

The invention is explained in the following in connection with a cylindrical roller bearing having fixed flanges on one of the race rings and either a loose or a fixed flange on the other bearing ring.

The purpose of the tongues is to prevent the rollers from falling out of the cage when one of the bearing rings is lacking in the bearing and thus make it possible for the cage, the rollers and the other race ring to form a self-contained unit. It is necessary that the rollers be retained accurately in place, i.e. that only a very slight radial displacement of the rollers is possible in order to enable the bearing to be assembled without difficulty. It is further undesirable that the rollers engage the tongues during running. In hitherto known types of cages it has been impossible to meet both these requirements simultaneously. The tongues have either engaged the rollers or permitted such radial displacement that the assembly with the outer bearing ring has been made difficult. Since there is a certain amount of peripheral play between the rollers and the pockets, the play between the rollers and the tongues must be still greater in order to avoid contact between them. The rollers must therefore be supported as far from the pitch circle as possible, preferably very close to the roller race having the loose flange. In known designs, however, the tongues are parallel to the respective axes of the rollers, and the flanges therefore prevent location of the tongues near the roller race. The tongues must therefore project from the annular portion of the cage between the flanges of the respective bearing rings. This in turn prevents both the above mentioned requirements from being met in known cages of the above mentioned type but it is feasible in a cage formed in accordance with the present invention.

Figure 2:
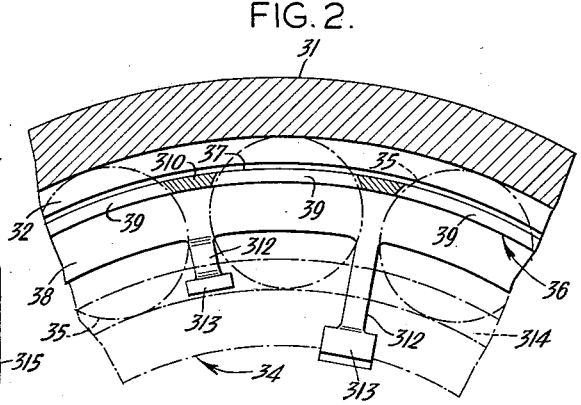
Figure 3:
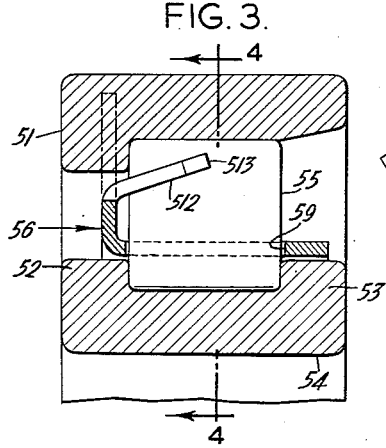
Figure 4:
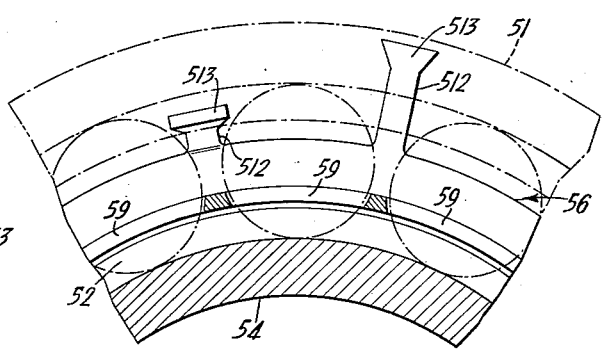
Figure 5:
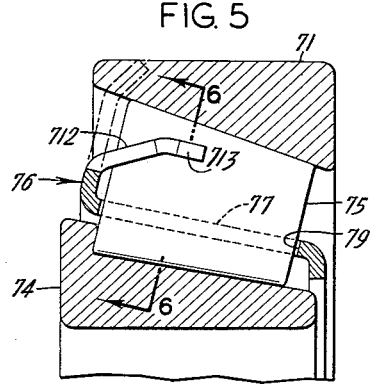
Figure 6:
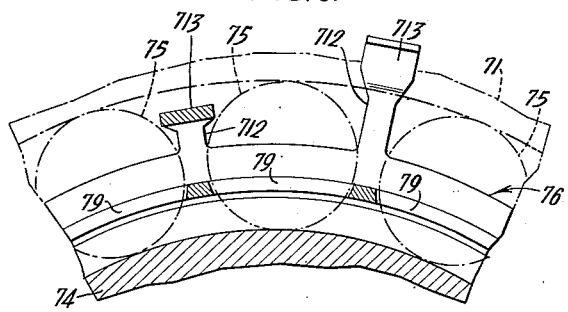

Three different forms of the invention are described in the following with reference to the accompanying drawings, in which FIG. 1 shows a cross section of a portion of a roller bearing having fixed flanges on the outer race ring and one fixed and one loose flange on the inner bearing ring. FIG. 2 is a section perpendicular to the axis of a portion of the same bearing. FIGS. 3 and 4 show corresponding views of a bearing having fixed flanges on the inner ring. FIG. 5, finally, shows a portion of a taper roller bearing in cross section and FIG. 6 is a section along the line V—V of FIG. 5.

In FIGURES 1 and 2 the numeral 31 designates an outer bearing ring having two fixed flanges 32 and 33. Cylindrical rollers 35 are located between the outer bearing ring 31 and an inner bearing ring 34. The inner ring is provided with a fixed flange 314 and a loose flange 315. The rollers are separated by a cage 36 comprising a cylindrical mantle portion 37 of sheet metal connected to a substantially flat annular portion 38. Rectangular pockets 39 are provided in the mantle 37 and are separated from each other by cross bars 310. The rollers are supported radially before the inner bearing ring 34 is inserted or after it is removed by tongues 312 bent in between the rollers and connecting with the annular portion 38. The free ends 313 of the tongues are broadened to support the rollers when the inner ring 34 is lacking from the bearing. These broader portions are so shaped and dimensioned that they normally can not come into contact with the rollers when the bearing is completely assembled.

A roller bearing according to FIGS. 1 and 2 is assembled in the following manner: The cage 36 is positioned within the outer ring 31. The rollers 35 are inserted radially outwards into their respective pockets 39 and the tongues 312 are bent from the position shown in dotted lines in FIG. 1 and the right hand portion of FIG. 2 to a position inclined inwards between two adjacent rollers. The free ends of the tongues prevent the rollers from dropping inwards. The inner ring 34 can then easily be inserted and assumes the position shown in FIG. 1.

The free ends 313 of the tongues 312 are broadened and their sides are substantially parallel to the axis of rotation of the bearing. The end portions support the rollers at their middles, whereby the rollers are prevented from tilting.

FIGURES 3 and 4 show a cylindrical roller bearing with fixed flanges 52 and 53 on the inner ring 54. The tongues 512 of the cage 56 in this case serve the purpose of retaining the rollers 55 in their pockets 59 by means of the end portion 513 when the outer race ring 51 is lacking from the bearing.

The invention is not limited to cylindrical roller bearings but can also be applied to taper roller bearings and spherical roller bearings. FIGS. 5 and 6 thus show a single row taper roller bearing. The cage 76 is similar in appearance to that shown in FIGS. 3 and 4. The conical portion 77 of the cage is provided with pockets 79 to accomodate conical rollers 75 which roll between the races of an outer ring 71 and an inner ring 74 respectively. The rollers are prevented from falling out of their pockets by tongues 712, the free ends of which are broadened as at 713. These portions of the tongues support the rollers opposite their centres of gravity and thus the rollers are prevented from tilting when the outer race ring is removed.

The invention is of course not limited to the specific form shown but the different elements of the roller bearings may be varied as required. The free ends of the tongues may be made in many different shapes within the scope of the claims.

We claim:

In combination with a cylindrical roller bearing having an inner race ring with at least one radially outwardly projecting flange adjacent one axial end thereof, an outer race ring with at least one radially inwardly projecting flange at one axial end thereof and a plurality of roller elements in the annular space between the race rings, a sheet metal cage comprising a mantle portion disposed radially at one side of the pitch circle of the set of roller elements, means defining a plurality of circumferentially spaced openings in said mantle portion providing pockets for the roller elements, an annular portion projecting radially from an outer edge of said mantle portion, a plurality of tongues inclined from said annular portion, each of said tongues being disposed between adjacent roller elements, the free end thereof being broader to provide a support portion for the roller elements, said support portion of each tongue being disposed adjacent the periphery of the set of roller elements and radially spaced a farther distance from the pitch circle of the set of rollers than the extremity of said race ring flanges, said support portions of each tongue being bisected by a plane passing through the center of gravity of the roller element perpendicular to the axis of the roller element to thereby support the roller elements in a manner limiting tilting thereof in their respective pockets.

References Cited in the file of this patent

UNITED STATES PATENTS

| | | |
|---|---|---|
| 1,165,434 | Michaud | Dec. 28, 1915 |
| 1,513,999 | Kifer | Nov. 4, 1924 |

FOREIGN PATENTS

| | | |
|---|---|---|
| 461,151 | Germany | June 13, 1928 |
| 857,458 | Germany | Dec. 1, 1952 |